United States Patent [19]

Jones

[11] Patent Number: 5,060,810
[45] Date of Patent: Oct. 29, 1991

[54] CLAMPS FOR LOAD BRACES

[76] Inventor: Gary Jones, 20 Prentiss St., P.O. Box 143, Monroeville, Ohio 44847

[21] Appl. No.: 518,573

[22] Filed: May 3, 1990

[51] Int. Cl.⁵ .................................................. A47F 5/00
[52] U.S. Cl. ...................................... 211/59.4; 211/4; 248/68.1
[58] Field of Search .................... 211/59.4, 70.4, 4, 8, 211/60.1; 224/42.38, 42.4; 248/68.1

[56] References Cited

U.S. PATENT DOCUMENTS

| | | | |
|---|---|---|---|
| 2,396,925 | 3/1946 | Morehouse | 248/68.1 |
| 2,404,531 | 7/1946 | Robertson | 248/68.1 |
| 3,590,752 | 7/1971 | DePew | 211/60.1 |
| 4,706,822 | 11/1987 | Remp et al. | 211/59.4 |
| 4,799,641 | 1/1989 | Koreski | 248/68.1 |

Primary Examiner—Robert W. Gibson, Jr.
Attorney, Agent, or Firm—Gifford, Groh, Sprinkle, Patmore and Anderson

[57] ABSTRACT

A pair of load brace holders or clamps which are designed to be mounted on a trailer or truck structure in parallel spaced relationship for storage of the load braces when they are not in use in a trailer or truck body to brace and stabilize the load or cargo, particularly partial loads. A base and cover of each clamp are hinged together and each have grooves for accomodating the load braces. Molded resilient inserts conforming to the scallops or grooves in the base and cover are used to cushion and to grip the load braces when the cover is in its closed position. A padlock can be applied to a hasp latch system for security.

14 Claims, 3 Drawing Sheets

CLAMPS FOR LOAD BRACES

BACKGROUND OF THE INVENTION

1. Field of the Invention

This invention relates to load braces or load bars, and, more particularly it relates to holders or clamps for storing load braces when they are not in use in a trailer or truck body stabilizing the cargo or load.

2. Description of the Prior Art

Typically, load braces are strapped to the deck or frame of the tractor or truck when they are not being used in a trailer or truck body to brace the load and restrain movement of the loaded cargo. Most commonly rubber straps or bungies are used. Sometimes they are strapped directly to the cab body. The straps sometimes let loose causing damage to the cab fairing and quarter fenders and the load braces themselves are often lost. Also with this type of temporary storage, the load braces are subject to theft when the vehicle is parked.

SUMMARY OF THE INVENTION

The present invention eliminates the problem of the load braces becoming accidentally detached from the tractor frame or truck body, and also eliminates the theft problem. Thus the present invention provides storage and security for the braces when they are not being used in a trailer.

The present invention provides a pair of holders or clamps which are normally bolted to the truck deck plate adjacent to each of its sides. The clamps commonly will provide storage for two load braces or for up to four load braces. Each of the clamps has a base having a two to four grooves for holding the braces. A resilient insert is secured to the base, this insert has a molded contour which conforms to the grooves of the base. A cover has a like number of grooves with the same resilient insert secured to it so that the contoured portion of the insert conforms to the grooves in the cover. A hinge is provided at one end of the cover and base for movement of the cover between an open position in which the load braces can be placed in the aligned grooves in the base of the clamps to a closed position in which the load braces are engaged in the grooves of the cover. The load braces are cushioned on both sides between the inserts. A latching device is provided at the end opposite to the hinge end. The latch has an aperture to accept a padlock so that each brace can be locked to prevent theft.

Mounting holes are provided within the body of the base so that the base can be bolted to the deck plate or truck frame. With the inside mounting holes, the bolts are inaccesible when the cover is locked to the base.

The hinge includes a tongue which depends from the cover to extend between two upwardly extending portions of the base side walls. A hinge pin extends through one of the side wall portions of the base and through the tongue of the cover and into the other side wall portion of the base. By making this second hole in the brace side wall a blind hole as opposed to a through hole, the pin cannot be driven out by someone attempting to steal the load braces. Preferably this pin is a roll pin which expands when seated.

The securing or latching means at the other end of the base and cover includes a hasp which is pinned to a projection extending outwardly from the end of the base. The pin extends through one leg of the hasp and through the projection and into the second leg of the hasp. A blind hole is also used in the second hasp leg to prevent driving the pin out. This pin is also preferably a roll pin to firmly secure the hasp to the base for pivotal movement. A tongue extends outwardly from the front end of the cover and the hasp is pivoted to clear the tongue as the cover is being swung to its closed position. The tongue has a hole through it so that the shackle of a standard padlock can be inserted to keep the cover locked to the base. The hasp is spring loaded to return it to its upright or locked position so that the cover will be retained even if a padlock is not used. Typically the clamps are made to store two or a maximum of four load braces.

Alternate mounting options are available to the most common one which places the load braces in a horizontal plane. Vertical mounting can be provided by an upright plate which attaches to the base and to a mounting plate which attaches to the tractor frame or deck.

Preferably the inserts are molded from a tire tread rubber compound which has proven durability under extreme weather conditions and road contamination such as salt. The base, cover and hasp are cast from heavy duty aluminum for long life and extra strength.

DRAWING

The prefered embodiments of the invention are illustrated in the drawing in which.

DETAILED DESCRIPTION OF THE PRESENTLY PREFERRED EMBODIMENTS OF THE INVENTION

Figure 1:
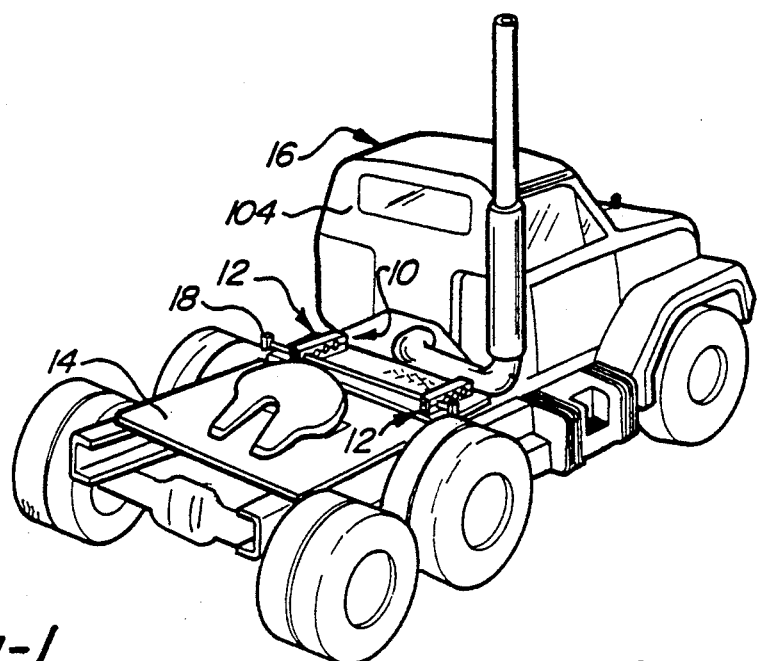
FIG. 1 is a perspective view of a tractor with the clamps of this invention attached to the deck plate showing a single load brace in place.

Referring to FIG. 1, the load brace holding device 10 of the present invention includes a pair of load brace clamps 12 which are mounted on the deck 14 of tractor 16. Normally they are mounted adjacent to the side edges of deck 14 as shown. One load brace 18 is shown held in the closed position of clamps 12 of FIG. 1.

Referring to FIGS. 2-6, a clamp designed to hold up to four load braces 18 is shown. Each load brace clamp 12 has a generally rectangular base 20 with a pair of spaced parallel scalloped side walls 22 having the upwardly directed semicircular scallops forming parallel grooves 24 for receiving load braces in parallel alignment. Each base has front and rear end walls 23 and 25 and a rear end portion 26 extending beyond rear end wall 25 containing a hinge 28 connecting a cover 30 to the base 20 for pivotal movement between an open position in which the load bars or braces 18 can be placed into the base grooves 24, to a closed position in which the cover 30 can be locked to the base 20.

Figure 5:
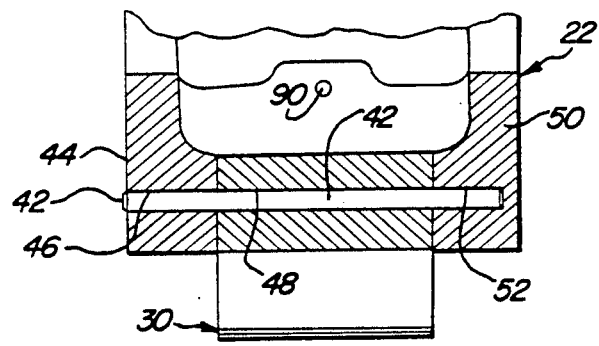
FIG. 5 is a partial sectional view along 5—5 of FIG. 4 showing the hinge pin in its installed position.
Figure 6:
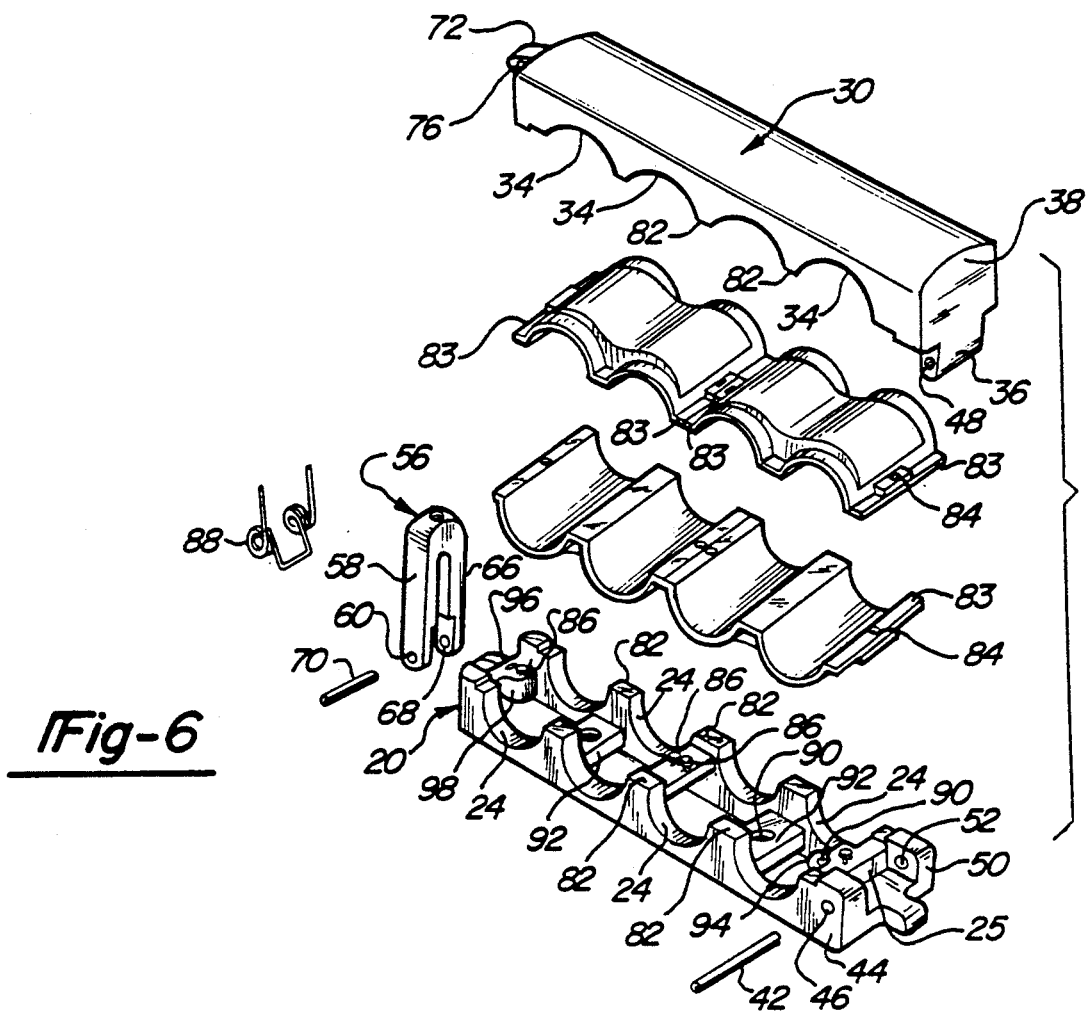
FIG. 6 is an exploded perspective view of the four brace holder of FIGS. 2 and 4 showing the details of the assembly of the entire clamp.

The cover 30 has parallel spaced scalloped side walls 32 similar base side walls 22 forming grooves 34 which embrace the load braces when the cover is in its closed position. Hinge 28 includes a tongue 36 extending downwardly from cover end wall 38 in between rear base side wall segments 44 and 50 to which it is connected by a hinge pin 42. Referring to FIGS. 5 and 6, rear end wall portion 26 of base 20 has a side wall segment 44 with a through hole 46, and the cover tongue 36 has a through hole 48, but base side wall segment 50 has a blind hole 52. When the hinge pin 42 is driven into these holes, it is difficult to remove since the hole 52 is not a through hole so that the hinge pin 42 can be driven from one side and out the other side. Hinge pin 42 is also preferably in the form of a roll pin so that it expands when it is driven into the respective holes in the base and cover.

A latch securing device 54 is located at the forward ends 23 and 74 of base 20 and cover 30. The latch 54 includes a hasp member 56 which is pivotally connected to base 20 by a pin 70.

Figure 2:
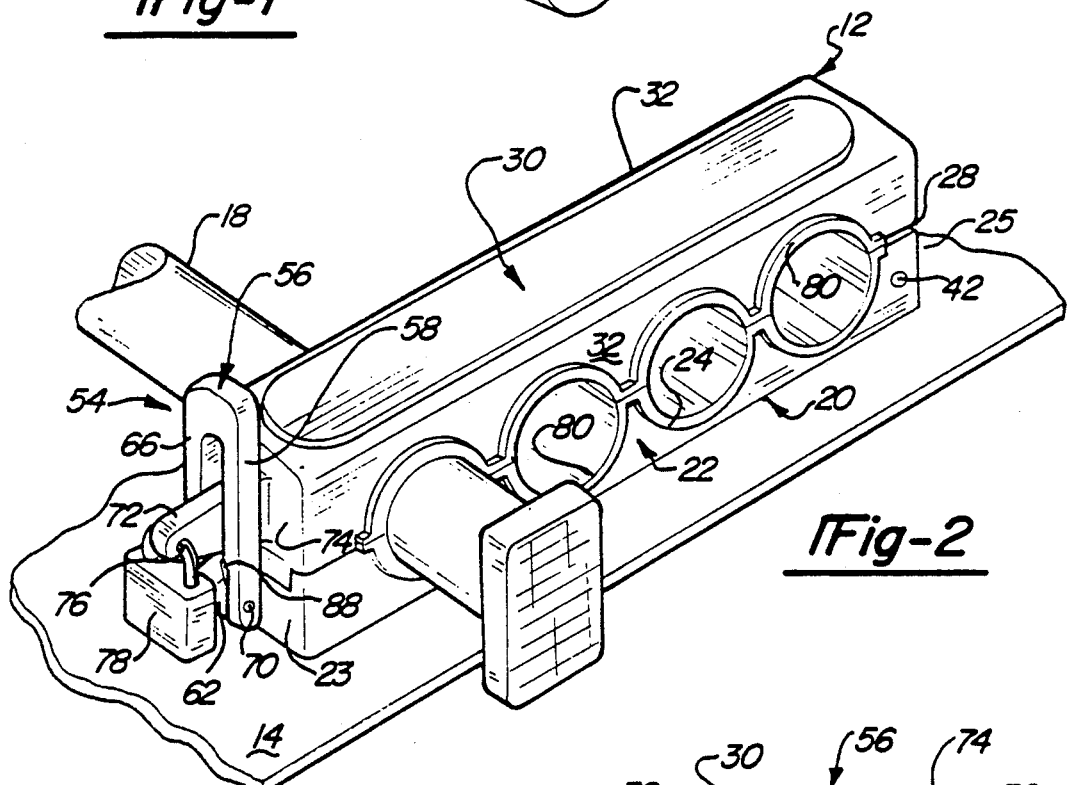
FIG. 2 is a perspective view of a four load brace clamp shown in its closed and locked position with a portion of a load brace shown in one of the four brace holding grooves.
Figure 3:
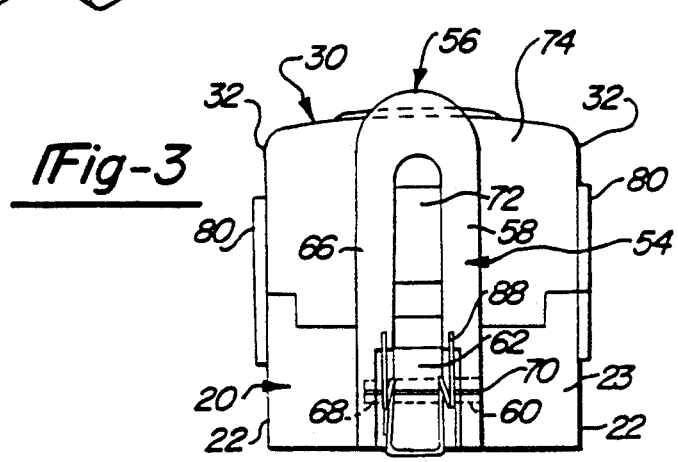
FIG. 3 is a front end view of the clamp of FIG. 2 showing the hasp and the details of the spring in its assembled position.
Figure 4:
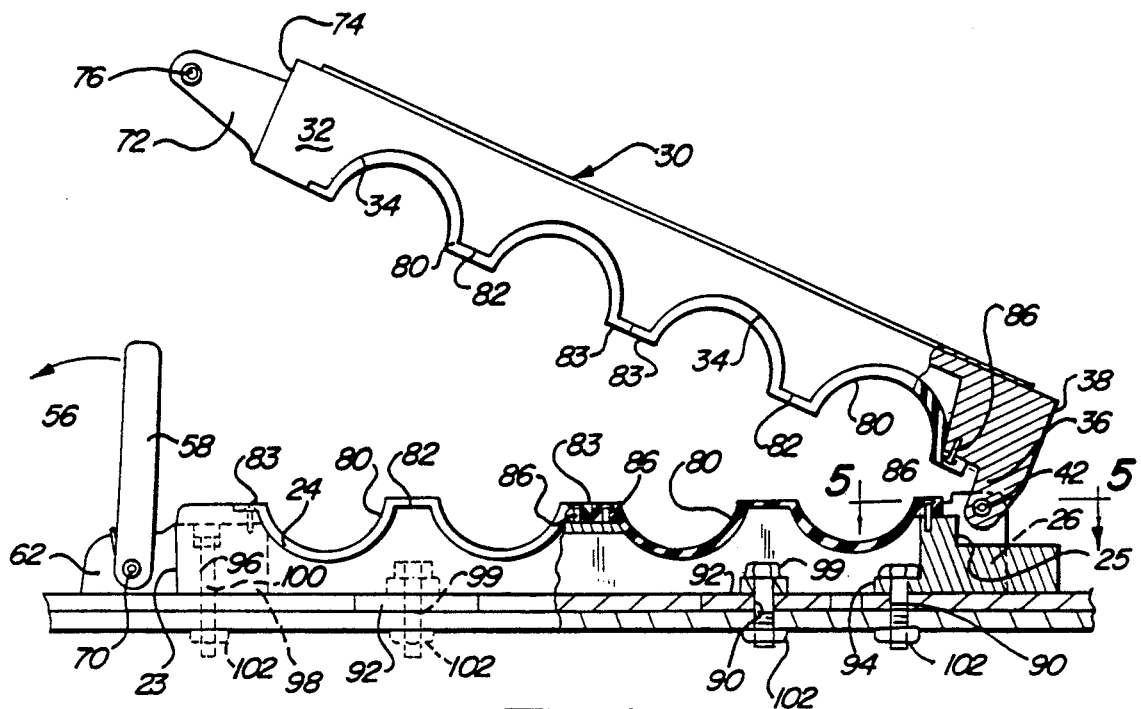
FIG. 4 is a side view partially in section of the four load brace holder of FIG. 2 showing further details of the means for mounting the resilient inserts and of hinge between the cover and base of the clamp.

Like the hinge 28, a first leg 58 of hasp 56 has a through hole 60; a base projection 62 extending outwardly from base front wall 23 has a through hole 64, FIG. 3, and a second hasp leg 66 has a blind hole 68 so that when pin 70 is driven into the holes to connect the hasp to base projections 62, it cannot be removed by driving the pin through the connection from one side to the other side. Pin 70 also is preferably a roll pin so that it expands and seats within the respective holes in the hasp and base projection. A tongue 72 projects outwardly from the forward end 74 of cover 30 so that the hasp 54 can be pivoted over the tongue 72 to retain the cover seated on the base. Tongue 72 has hole 76 through which the shackle of lock 78 can be inserted to lock the clamp 12 in its closed position as shown in FIG. 2. Spring 88 is inserted between the hasp 56 and the base member 20 to bias the hasp into its upright or closed position as shown in FIG. 2 and 3.

A resilient insert or gasket 80 is molded from a tire rubber compound in the form to match the scalloped side walls 22 of base 20 including the groove portion 24 of the scallop and the flat top portion 82. It is convenient to use two resilient inserts 80 in abutting relationship for the four load brace design of FIGS. 1-6 so that the same insert 80 molded for the two load bar design of FIG. 7 and 8 can be used in the four load bar design of FIGS. 1-6. The flat ends 83 of the gaskets have a hole 84 so that the gasket may be installed on the base member 20 by deforming the gasket over headed drive pins 86 on the the base member. Similarly, the gaskets 80 are applied to the scalloped side walls 32 of cover 30 over headed drive pins 86 in the cover. The inserts 80 also conform to the cover grooves 34 and flat portion 82 of cover side walls 32.

When the cover 30 has been assembled to the base 20 by hinge 28, the hasp 56 has been assembled to the base 20 by the pin 70, and the inserts 80 have been forced over the drive pins 86 on the base and cover, the clamps 12 are functional to retain the load braces 18 firmly by the slight compression of inserts 80 around the shanks of the load braces. The flat end portion 83 of the base end cover inserts 80 are also squeezed together by the flat portions 82 of the base end cover scalloped side walls. This provides a secure storage of the load braces without rattles or any movement of the braces. When the cover 30 is being swung to its closed position as seen in FIGS. 2 and 3, the hasp 56 is swung against the resistance of its spring 88 to a forward position so that the cover tongue 72 will clear the hasp. When the cover 30 is in its closed position, the hasp is allowed to return its vertical position as dictated by the bias of spring 88.

The load brace clamps are mounted on the tractor or truck structure by bolts, and most often they are in a spaced relationship adjacent to the edges of a deck plate 14 mounted on the main frame members as shown in FIG. 1. The mounting holes 90 the base member 20 are located in webs 92 which extend between the side walls 22 of the base. An additional mounting hole 90 is provided in a tab 94 extending from the rear end portion 26 of the base, and an additional recess mounting hole 96 is contained in a boss 98 at the forward end of the base if additional mounting bolts are desired. Shorter bolts 99 extend through the mounting holes 90 in the webs 92 and projection 94 while a longer bolt 100 is necessary when used to attach through recess hole 96. Nuts 102 complete the connection of the base 20 to the truck or tractor structure 14. In some instances it may be desirable to mount the clamps at other locations on the tractor or truck structure. For example, the clamps 12 could be mounted on the rear wall 104 of the tractor cab or sleeper, or in the case of a unitary truck, the mounting may be at various location.

Figure 7:
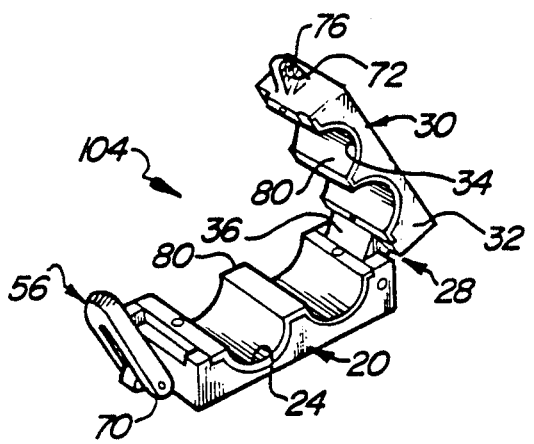
FIG. 7 is a perspective view of a two brace clamp shown in its open position.
Figure 8:
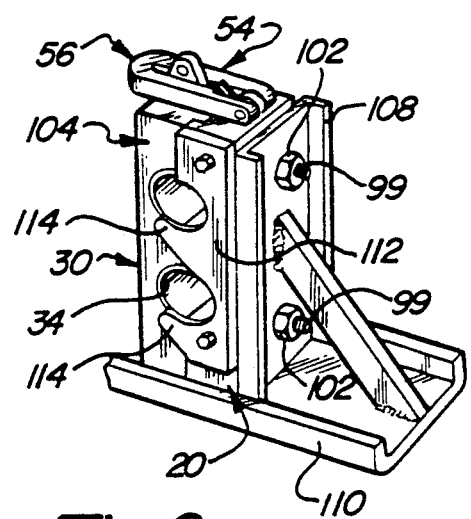
FIG. 8 is a perspective view of the two brace clamp of FIG. 7 shown in its closed position in a vertical mounting environment.

The two load brace holding clamps 104 shown in FIGS. 7 and 8 have all of the identical components used in the four load brace holding clamps 12 shown in FIGS. 1-6. Consequently, the numerals in FIGS. 7 and 8 are the same as those used for the same parts in FIGS. 1-6.

FIG. 8 shows a mounting structure 106 used for vertically mounting the two load brace clamp 104 or the four load brace clamp 12. Upright plate 108 is attached to base 20 and to mounting plate 110 which can be drilled to suit the particular application if bolts are used to mount the clamps, or the mounting plate can be brazed or welded to the tractor frame or deck. A holding plate 112 can also be bolted to the base 20 as shown to provide retaining fingers 114 which will hold the load braces in the base before cover 30 is moved to its closed position. While the two load brace clamps of FIG. 7 is shown in the vertical mounting in FIG. 8, the four load brace clamps of FIGS. 1-6 can be vertically mounted in the same manner.

The embodiments of the invention in which an exclusive property or privilege is claimed are defined as follows:

1. A pair of claims for storage of load braces extending between the clamps as they are mounted on a truck structure, each clamp including:
   a base having a plurality of grooves;
   a resilient insert secured to said base having a contoured portion conforming to the grooves in said base;
   a cover having a plurality of grooves;
   a resilient insert secured to said cover having a contoured portion conforming to the grooves in said cover;

a hinge securing one end of said Cover to said base for movement between an open position in which load braces can be placed in aligned grooves in each of said clamps to a closed position in which the load braces are engaged in the grooves of said cover being cushioned between the insert attached to said base and the insert attached to said cover;

securing means at the other ends of said base and cover for securing said cover to said base when said cover is in its closed position over said base; and mounting means for attaching said clamps to said truck structure, said clamps being spaced apart and aligned to receive said load braces in the grooves of said base.

2. The pair of clamps according to claim 1 wherein said mounting means includes spaced apertures to receive attachment bolts, said apertures being concealed by said cover when said cover is its closed position to prevent unauthorized removal of said clamps from said truck structure.

3. The pair of clamps according to claim 1 wherein said hinge includes a tongue depending from said cover and a pair of spaced wall portions on said base, said tongue extending between said wall portions, and a hinge pin extending through one of said wall portions, said tongue and into said other wall portion.

4. The pair of clamps according to claim 3 wherein said other wall portion has a blind end aperture into which said hinge pin is driven so that one end of the hinge pin is unaccesible to prevent unauthorized drive through removal of the hinge pin, opening of the cover and theft of the load braces.

5. The pair of clamps according to claim 1 wherein said securing means includes a hasp extending upwardly from said base and a tongue extending outwardly from the unhinged end of said cover, said hasp being pivotable to encompass said tongue once the cover is in its closed position.

6. The pair of clamps according to claim 5 wherein said tongue has an aperture adjacent its free end to receive a lock when said cover is in its closed position and said tongue extends through said hasp to prevent pivoting of said hasp and opening of said cover.

7. The pair of clamps according to claim 6 further including a spring acting between said hasp and said base to move said hasp to an upright position.

8. The pair of clamps according to claim 1 wherein said resilient insert is made from a tire tread rubber composition.

9. The pair of clamps according to claim 1 wherein said resilient inserts have apertures adjacent each of their ends and said base and cover have spaced headed drive-pins which are received in said apertures as said inserts are forced over said drive pins on said base and on said cover.

10. The pair of clamps according to claim 1 wherein said base and cover each have four grooves to accomodate four load braces.

11. The pair of clamps according to claim 10 wherein said insert secured to said base includes two molded pads in end to end abutment, and said insert secured to said cover includes two molded pads in end to end abutment.

12. The pair of clamps according to claim 1 wherein said mounting means includes an upright plate attached to said base; and a mounting plate attached to said upright plate and having means for attachment to said truck whereby said load bars will be held in vertical alignment to each other.

13. A pair of clamps for storage of load braces extending between the clamps as they are mounted on a truck structure, each clamp including:

a base having a pair of parallel longitudinally extending side walls and a pair of end walls extending between said side walls, said side walls having a top opening scalloped surface forming a plurality of load brace holding grooves;

a resilient insert secured to said base member having a contoured portion conforming to said scalloped side walls of said base member;

a cover having a pair of longitudinally extending side walls and a pair of end walls extending between said side walls, said side walls having a bottom opening scalloped surface to form a plurality of load brace holding grooves;

a resilient insert secured to said cover having a contoured portion conforming to said scalloped side walls of said cover member;

a hinge securing one of said end walls of said cover to one of said end walls of said base for movement between an open position in which said load braces can be placed in aligned grooves in each of said clamps to a closed position which the load braces are engaged in the grooves of said cover being cushioned between the insert attached to said base and the insert attached to said cover;

securing means extending from the other end walls of said base and cover for securing said cover to said base when said cover is in its closed position over said base; and mounting means for attaching said clamps to said truck structure, said clamps being spaced apart and aligned to receive said load braces in the grooves of said base.

14. The pair of clamps according to claim 13 wherein said mounting means includes at least two webs which extend between said side walls, each of said webs having an aperture to receive an attachment bolt, said apertures being concealed by said cover when said cover is in its closed position to prevent unauthorized removal of said clamps from said truck structure.

* * * * *